United States Patent
Conrads et al.

(10) Patent No.: US 6,195,406 B1
(45) Date of Patent: Feb. 27, 2001

(54) SPRAY LINES FOR A PRESSURIZER OF A PRESSURED WATER REACTOR

(75) Inventors: Hermann-Josef Conrads, Herzogenaurach; Erwin Laurer, Möhrendorf; Jürgen Model, Erlangen; Karl Fäser, Bubenreuth, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/336,958

(22) Filed: Jun. 21, 1999

Related U.S. Application Data

(63) Continuation of application No. PCT/EP97/06880, filed on Dec. 9, 1997.

(30) Foreign Application Priority Data

Dec. 20, 1996 (DE) ............................................. 196 53 526

(51) Int. Cl.$^7$ ............................. G21C 1/09; G21C 17/02; G05D 9/00
(52) U.S. Cl. ........................... 376/307; 376/283; 165/302
(58) Field of Search ..................................... 376/307, 283, 376/289, 299, 282; 165/301, 302

(56) References Cited

U.S. PATENT DOCUMENTS

| | | | |
|---|---|---|---|
| 3,164,174 | 1/1965 | Berthod et al. | 138/30 |
| 4,056,436 * | 11/1977 | Bukrinsky et al. | 376/282 |
| 4,124,067 | 11/1978 | Bonnet et al. | 165/107 |
| 4,664,877 | 5/1987 | Magee et al. | 376/307 |
| 5,309,488 * | 5/1994 | Matsuoka | 376/282 |

FOREIGN PATENT DOCUMENTS

| | | |
|---|---|---|
| 30 47 771 C2 | 6/1983 | (DE) . |
| 0 058 836 A1 | 9/1982 | (EP) . |
| 0 212 949 A2 | 3/1987 | (EP) . |
| 0 723 270 A1 | 7/1996 | (EP) . |

OTHER PUBLICATIONS

"BASF gets safety approval for power-process heat PWR plant," Nuclear Engineering International, pp. 40–41, Jun. 1976.*

Japanese Patent Abstract No. 08304588 (Koji), dated Nov. 22, 1996.

* cited by examiner

*Primary Examiner*—Charles T. Jordan
*Assistant Examiner*—Kyoyetack K. Mun
(74) *Attorney, Agent, or Firm*—Herbert L. Lerner; Laurence A. Greenberg; Werner H. Stemer

(57) ABSTRACT

A pressurizer includes a casing in which at least one spray line ends. The spray line is guided through a wall in a lower region of the casing and is disposed in such a way as to run upward inside the casing. The spray line ends at its geodetically highest point.

7 Claims, 4 Drawing Sheets

SPRAY LINES FOR A PRESSURIZER OF A PRESSURED WATER REACTOR

CROSS-REFERENCE TO RELATED APPLICATION

This application is a continuation of copending International Application Ser. No. PCT/EP97/06880, filed Dec. 9, 1997, which designated the United States.

BACKGROUND OF THE INVENTION

Field of the Invention

The invention relates to a pressurizer with a casing, in which at least one spray line ends.

Such pressurizer are customary in a nuclear power plant with a pressurized water reactor. There, they are connected to a branch of a primary circuit which leads from a reactor. In the pressurizer, there is a spray system which is fed with water from a primary-circuit line that leads from a steam generator to the reactor. The water which is introduced through the spray system is therefore relatively cold as compared to the water which is situated inside the pressurizer. The spray system is generally closed off through the use of spray valves. The spray valves are only opened when an excessively high pressure is generated in the pressurizer, and the pressure in the pressurizer is lowered by praying-in relatively cold water. However, a valve cone of one of the spray valves may also have a small hole, so that some water is sprayed into the pressurizer continuously, even when the spray valve is closed.

Heretofore, it has been customary to guide the spray lines into the interior of the pressurizer through a so-called spray lid, which is screwed onto a central flange on an upper dome of the pressurizer. To that end, the spray lines initially run upward from the primary circuit and then, after they have passed through a bend above the pressurizer, they run downward into the pressurizer.

Heretofore, a so-called spray shroud has been necessary to ensure that the relatively cold water which is sprayed-in does not strike the hot wall of the pressurizer, which would lead to undesirable transient temperatures that would cause material fatigue. That spray shroud is a sheet-metal cylinder which is open at the top and bottom and is disposed concentrically inside the pressurizer. The water which is sprayed-in then strikes the inner wall surface of the sheet-metal cylinder, without coming into contact with the pressure-supporting casing wall.

Spray lines are made from austenitic steel. Due to their small diameter, it is not possible for weld seams to be ground internally. Consequently, it is not possible to completely rule out fracture of a spray line. If a spray line breaks, expensive measures are needed to ensure that line parts which are thrust outward or an emerging jet of steam do not cause secondary damage in the power plant.

Since the spray lines are guided downward into the pressurizer, at least the downwardly directed part of the spray lines empties when the spray valves are closed. Then, saturated steam from the pressurizer can penetrate into the spray lines and condense therein. The condensate then flows back into the pressurizer and makes room for fresh saturated steam. Therefore, according to the principle of conventional steam heating, at least the downwardly directed section of a spray line is continuously heated. Then, due to the temperature differences, feeding relatively cold water in when necessary may lead to material fatigue of the spray lines. If the spray valves are disposed above the pressurizer, the saturated steam also reaches the spray valves, where it can cause damage in the same way. Since the saturated steam inside the pressurizer is radioactive, there is also a risk of the spray lines as well as the spray valves being exposed to radiation.

SUMMARY OF THE INVENTION

It is accordingly an object of the invention to provide a pressurizer with a spray device, which overcomes the hereinafore-mentioned disadvantages of the heretofore-known devices of this general type, in which power-plant devices that are relevant to safety cannot be damaged by a fracturing spray line (causing line parts to strike outward or a jet of steam) and furthermore in which temperature fluctuation or radiation exposure does not impair the stability of any part of a spray line or of any spray valve.

With the foregoing and other objects in view there is provided, in accordance with the invention, a pressurizer, comprising a casing having a wall and a lower region; a volume-compensation line leading from a hot system and ending in the casing; and a spray line only intended for cooling, the spray line leading from a cooler system, guided through the wall in the lower region, extended upward inside the casing and ending in the casing at a geodetically highest point of the spray line.

In particular, this provides the advantage of exposing the spray line to only a minimal differential pressure with respect to its surroundings. Consequently, fracture of a spray line inside the pressurizer should not be expected. Even if a fracture were to occur, the minimal differential pressure means that there should be no expectation of any damaging movements of parts of the spray line which are to be attributed to a recoil. Simply because the spray line runs almost entirely inside the pressurizer, the risk of secondary damage caused by fracture of the line outside the pressurizer is minimized.

The fact that the spray line ends at its geodetically highest point means that when the spray line is closed, it is no longer possible for any water to flow out of the spray line into the pressurizer. The spray line remains full of water until it is opened into the pressurizer. In particular, a spray valve disposed outside the pressurizer is also always full of water. It is therefore impossible for any saturated steam to penetrate into the spray line and to the spray valve, a phenomenon which would lead to temperature fluctuations. This provides the advantage of considerably reducing loads exerted on the spray system by temperature fluctuations as well as by exposure to radiation.

Placing the spray line inside the pressurizer also provides the advantage of requiring only a few weld seams, at which it is not entirely possible to rule out a fracture of the line, on the relatively short portion of the spray line which still has to be situated outside the pressurizer. Inside the pressurizer, the spray line advantageously only has to have a relatively small wall thickness, since the differential pressure between the inside of the spray line and its surroundings is low.

In accordance with another feature of the invention, the spray line has one or more spray nozzles in the region of its highest point. This provides good distribution of water which is fed into the pressurizer.

In accordance with a further feature of the invention, a portion of the spray line which is provided with one or more spray nozzles is, for example, directed upward at an angle. In this way, the spray line remains full of water all the way to the spray nozzles when the spray valve is closed. However, it is ensured that the water is well distributed during spraying.

In accordance with an added feature of the invention, the spray line is, for example, guided through the wall of a lower cylindrical part of the casing of the pressurizer at an oblique angle with respect to the wall.

In accordance with an additional feature of the invention, the spray line is guided through the wall of a lower cylindrical part of the casing at right angles to the wall.

In accordance with yet another feature of the invention, the spray line is guided through the wall of a dome-like part of the casing, which part closes off the casing at the bottom, at right angles to the wall. This latter embodiment provides the particular advantage that the largest possible section of the spray line runs inside the pressurizer, where the pressure line only has to withstand a slight pressure difference between the inside and the outside. Consequently, a small wall thickness of the line is sufficient over the longest possible distance of the spray line. The spray line is therefore particularly economical to produce.

In accordance with a concomitant feature of the invention, the spray line is guided through the wall of the casing, where it forms a fixed point. This fixed point acts for the outer and inner parts of the line, resulting in the advantage that movements of one of the two parts of the spray line cannot be transmitted to the other part.

Since the spray lines are made from austenitic material and the pressurizer is made from ferritic material, different thermal expansions may occur. This is true even if the pressurizer is lined with an austenitic material on the inside. In order to prevent damage as a result of different thermal expansions, the spray lines inside the pressurizer may be attached in such a way that it is possible for the spray lines to move relative to the pressurizer.

The pressurizer according to the invention in particular provides the advantage of substantially ruling out damage to the spray lines, and consequently secondary damage caused by fractured spray lines as well.

Other features which are considered as characteristic for the invention are set forth in the appended claims.

Although the invention is illustrated and described herein as embodied in a pressurizer with a spray device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
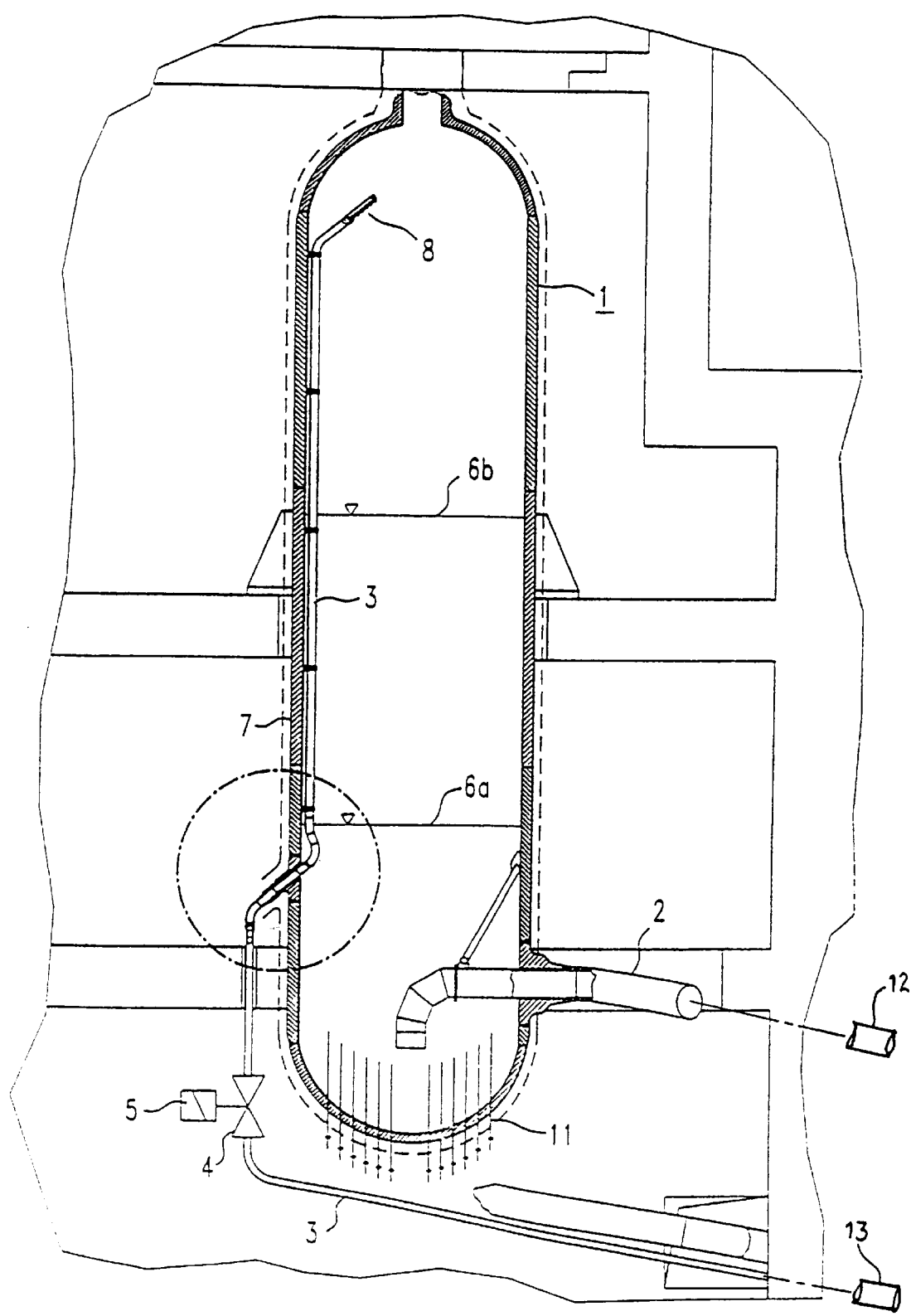
FIG. 1 is a fragmentary, diagrammatic, partly sectional view of a pressurizer with a spray device.

Referring now to the figures of the drawings in detail and first, particularly, to FIG. 1 thereof, there is seen a pressurizer 1, which usually forms part of a nuclear power plant with a pressurized water reactor, where it is connected to a hot part or system 12 of a primary circuit through a volume-compensation line 2. If the pressure in the primary circuit were to be too high, water, which can be branched off from a cold part of the primary circuit, is sprayed into the pressurizer 1. To this end, a spray line 3 leads from the cold part or system 13 and ends in the pressurizer 1. A spray valve 4 with a controllable or ON/OFF actuator 5 is disposed in the spray line 3 outside the pressurizer 1. The spray valve 4 is controlled according to the pressure in the primary circuit. Water levels 6a, 6b for zero load and normal operation of the nuclear power plant are indicated in the pressurizer 1. Heater rods 11 are disposed in a lower section of the pressurizer 1.

The spray line 3 runs from outside a casing 7 of the pressurizer 1 through a wall of a lower cylindrical part of the casing 7, into an interior of the casing 7, at an oblique angle with respect to the wall. Inside the casing, the spray line 3 runs continuously upward and ends at its geodetically highest point. The spray line 3 is guided along an inner wall surface of the casing 7. The spray line 3 has spray nozzles 8 in the region of its highest point. This portion of the spray line 3 which has the spray nozzles 8 is directed upward at an angle. Water is advantageously sprayed into the pressurizer 1 from its upper region through the use of this configuration. Nevertheless, when the spray valve 4 is closed it is impossible for any part of the spray line 3 between the spray valve 4 and the spray nozzles 8 to become empty. Consequently, it is also impossible for any steam to penetrate into the spray line 3 and condense therein, and there is no possibility of temperature fluctuations or exposure to radiation in the spray line 3.

In particular, the spray line 3 inside the pressurizer 1 is only exposed to a slight pressure difference between its interior and its exterior, so that a relatively thin spray line 3 is sufficient, yet there is no risk of the spray line being fractured. Even in the unlikely event of a fracture of the spray line 3 inside the pressurizer 1, the small pressure difference means that there is no possibility of secondary damage caused by recoil effects.

Figure 2:
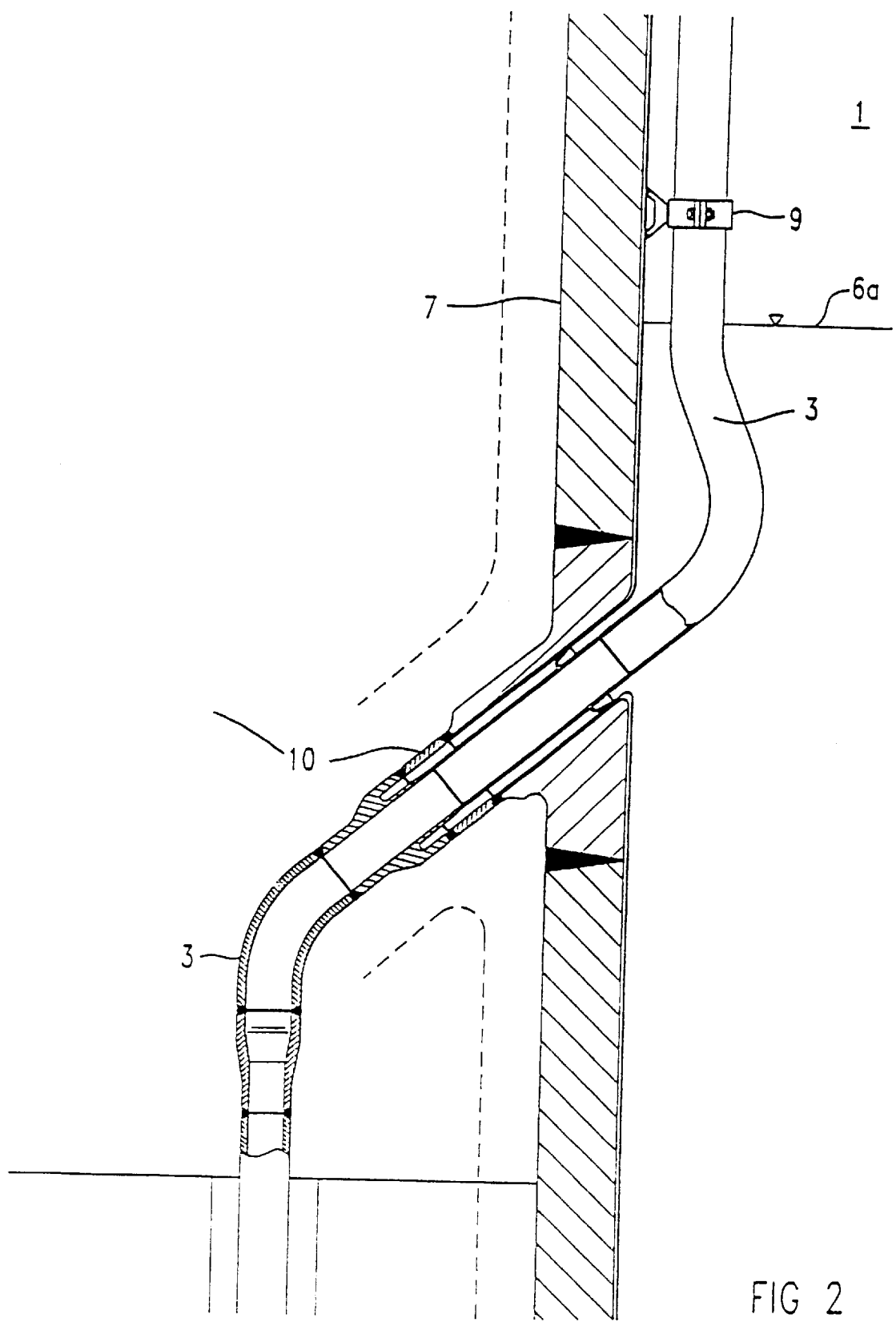
FIG. 2 is an enlarged view of a portion of FIG. 1 showing a first embodiment for guiding a spray line through a wall of a pressurizer casing.

FIG. 2 is an enlarged view of a portion of FIG. 1 which shows the structure that allows the spray line 3 to be guided through the wall of the casing 7 at an oblique angle. Inside the casing 7, the spray line 3 is connected to the wall of the casing 7 by clamps 9, which allow the spray line 3 to move in axial direction but do not allow it to rotate. Due to the small pressure differences between the interior and the surroundings of the spray line 3, a relatively thin-walled spray line 3 is sufficient inside the pressurizer 1. A larger wall thickness is required outside the pressurizer 1. A fixed point 10 for the spray line 3 is disposed in the region of the inclined passage through the wall.

Figure 3:
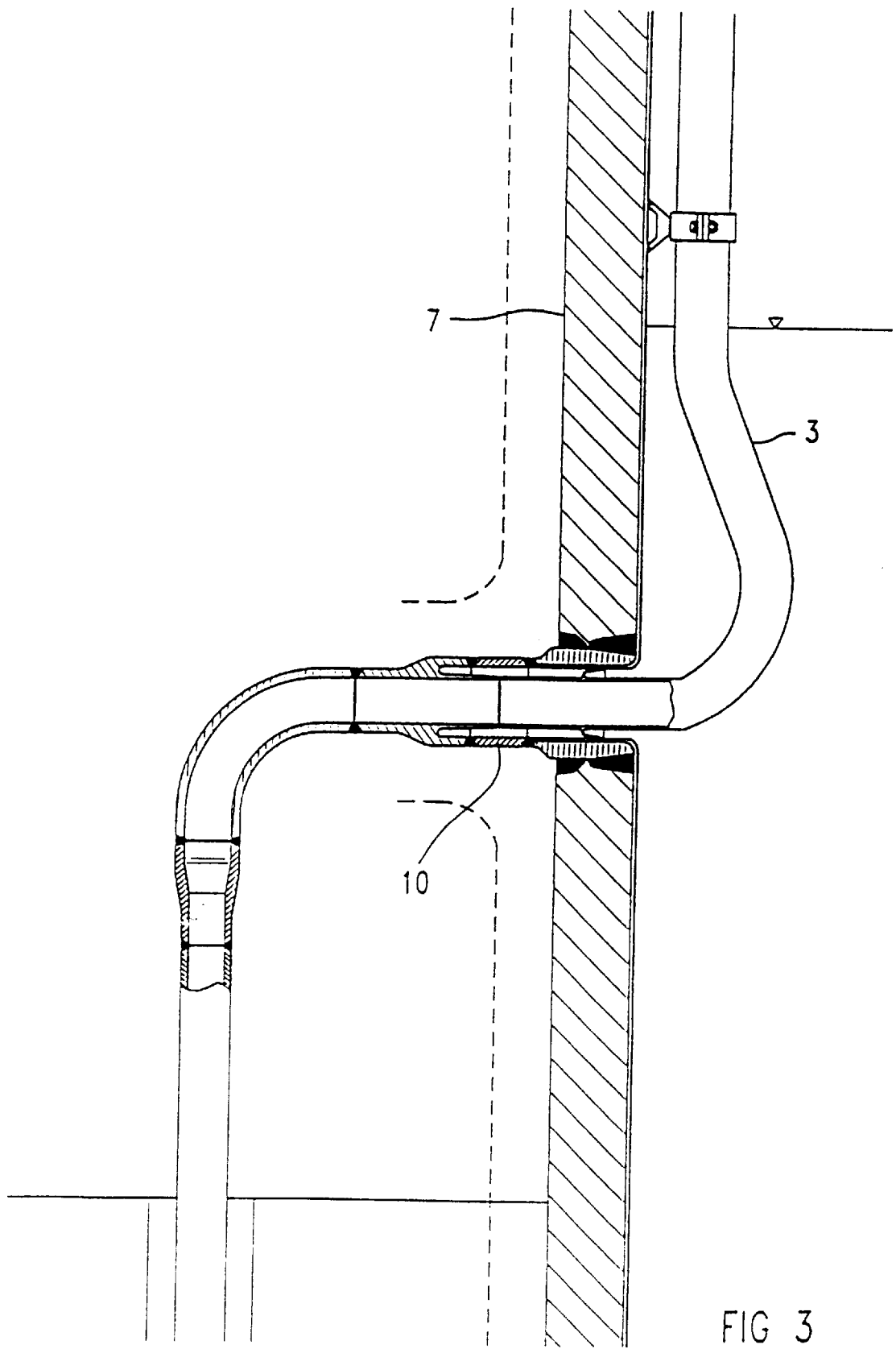
FIG. 3 is a view similar to FIG. 2 showing a second embodiment for guiding through a spray line.

FIG. 3 shows another embodiment for guiding the spray line 3 through the wall of the casing 7. The FIG. 3 embodiment differs from the embodiment according to FIG. 2 only in that the spray line 3 is guided through the wall at right angles thereto. Although this requires a more complex path for the line as compared to the embodiment according to FIG. 2, the region where it is guided through the wall is simplified.

Figure 4:
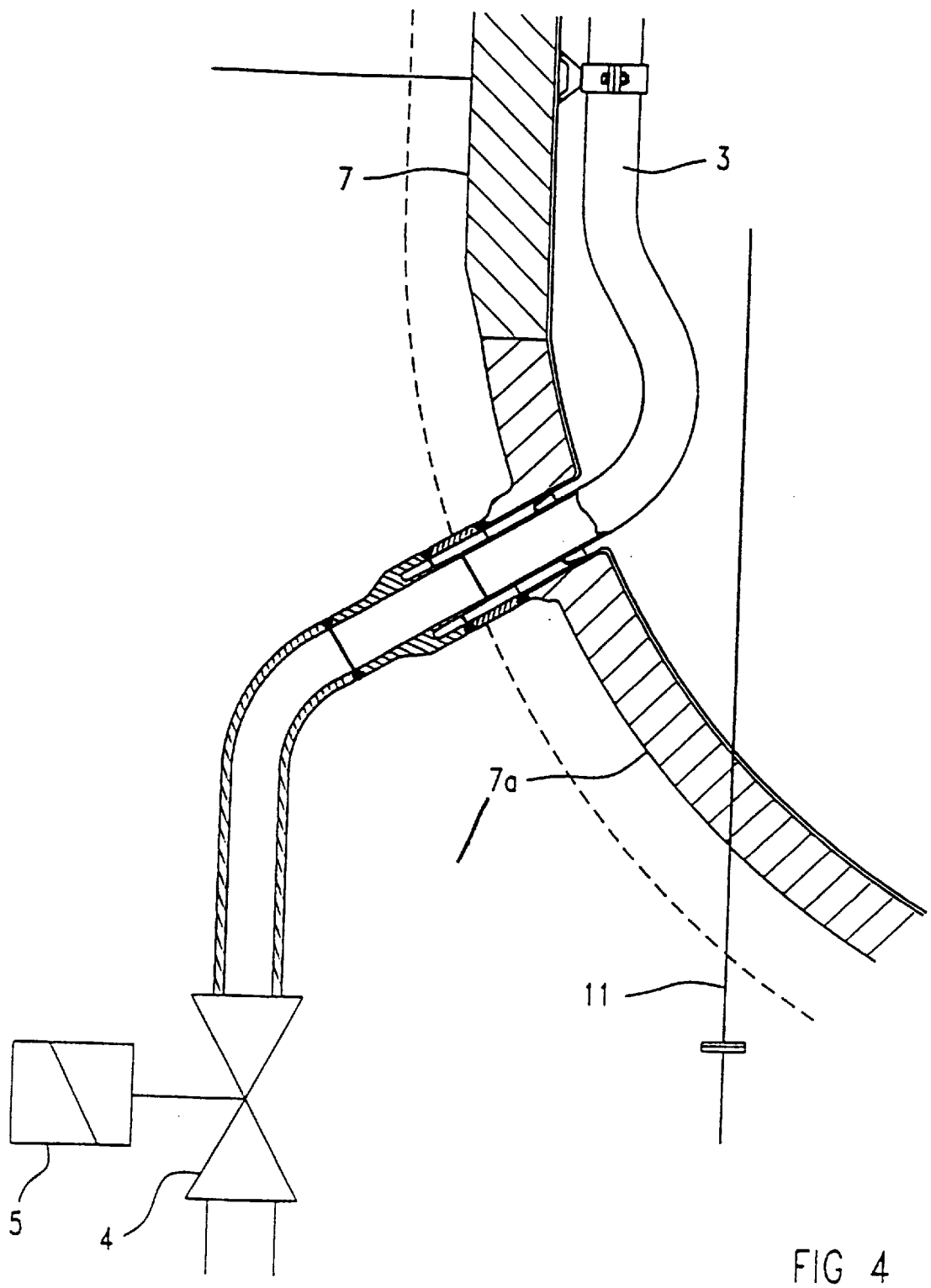
FIG. 4 is a view similar to FIGS. 2 and 3 showing a third embodiment for guiding through a spray line.

FIG. 4 shows the most advantageous way of guiding the spray line 3 through the wall of the casing 7. The spray line 3 is guided through with slight curvatures at right angles to the wall of the casing 7, in a dome-like part 7a of the casing 7, which closes off the casing 7 at the bottom. In this embodiment, the spray line 3 is also disposed in an inexpensive, stable manner inside the pressurizer 1 over as long a distance as possible.

This is because the spray line 3 cannot be guided into the pressurizer 1 directly from below, since that is where the heater rods 11, which are also shown in FIG. 1, are disposed.

We claim:

1. A pressurizer of a nuclear power plant comprising:
   a casing having a wall and a lower region;
   a volume-compensation line ending in said casing; and
   a spray line only intended for cooling, said spray line guided through said wall in said lower region, extended upward inside said casing and ending in said casing at a geodetically highest point of said spray line.

2. The pressurizer of a nuclear power plant according to claim 1, wherein said spray line has at least one spray nozzle in the vicinity of said highest point.

3. The pressurizer of a nuclear power plant according to claim 2, wherein said spray line has a portion directed upward at an angle, said portion having said at least one spray nozzle.

4. The pressurizer of a nuclear power plant according to claim 1, wherein said lower region of said casing is a lower cylindrical part, and said spray line is guided through said wall in said lower cylindrical part at an oblique angle relative to said wall.

5. The pressurizer of a nuclear power plant according to claim 1, wherein said lower region of said casing is a lower cylindrical part, and said spray line is guided through said wall in said lower cylindrical part at right angles to said wall.

6. The pressurizer of a nuclear power plant according to claim 1, wherein said casing has a bottom and a dome-like part closing off said bottom, and said spray line is guided through said wall in said dome-like part at right angles to said wall.

7. The pressurizer of a nuclear power plant according to claim 1, wherein said spray line is guided through said wall at a location forming a fixed point.

\* \* \* \* \*